US011143879B2

(12) United States Patent
Sapienza et al.

(10) Patent No.: US 11,143,879 B2
(45) Date of Patent: Oct. 12, 2021

(54) SEMI-DENSE DEPTH ESTIMATION FROM A DYNAMIC VISION SENSOR (DVS) STEREO PAIR AND A PULSED SPECKLE PATTERN PROJECTOR

(71) Applicant: Samsung Electronics Co., Ltd, Suwon-si (KR)

(72) Inventors: Michael Sapienza, Mountain View, CA (US); Ankur Gupta, Santa Clara, CA (US); Abhijit Bendale, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 16/172,473

(22) Filed: Oct. 26, 2018

(65) Prior Publication Data

US 2019/0361259 A1 Nov. 28, 2019

Related U.S. Application Data

(60) Provisional application No. 62/676,844, filed on May 25, 2018.

(51) Int. Cl.
*G02B 27/48* (2006.01)
*G06T 19/00* (2011.01)
(Continued)

(52) U.S. Cl.
CPC ......... *G02B 27/48* (2013.01); *G03B 21/2006* (2013.01); *G06T 7/50* (2017.01);
(Continued)

(58) Field of Classification Search
CPC ......... G02B 27/48; G06T 7/593; G06T 7/521; G06T 19/006; G06T 7/50; G03B 21/2006
(Continued)

(56) References Cited

U.S. PATENT DOCUMENTS

2016/0189387 A1* 6/2016 Kannan .............. G01B 11/2545
382/106
2016/0217584 A1 7/2016 Shin et al.
(Continued)

FOREIGN PATENT DOCUMENTS

DE 102018129009 A1 6/2019
EP 3051492 A1 8/2016

OTHER PUBLICATIONS

Notification of Transmittal of the International Search Report and the Written Opinion of the International Searching Authority, or the Declaration dated Aug. 23, 2019 in connection with International Patent Application No. PCT/KR2019/005387, 10 pages.
Vidal et al., "Ultimate SLAM? Combining Events, Images, and IMU for Robust Visual Slam in HDR and High-Speed Scenarios", IEEE Robotics and Automation Letters, vol. 3, No. 2, Apr. 2018, p. 994-1001.
(Continued)

*Primary Examiner* — Ayodeji O Ayotunde

(57) ABSTRACT

A method for semi-dense depth estimation includes receiving, at an electronic device, a control signal of a speckle pattern projector (SPP and receiving from each sensor of a dynamic vision sensor (DVS) stereo pair, an event stream of pixel intensity change data, wherein the event stream is time-synchronized with the control signal of the SPP. The method further includes performing projected light filtering on the event stream of pixel intensity change data for each sensor of the DVS stereo pair, to generate synthesized event image data, the synthesized event image data having one or more channels, each channel based on an isolated portion of the event stream of pixel intensity change data and performing stereo matching on at least one channel of the synthesized event image data for each sensor of the DVS stereo pair to generate a depth map for at least a portion of the field of view.

20 Claims, 11 Drawing Sheets

(51) Int. Cl.
  *G03B 21/20*    (2006.01)
  *G06T 7/50*     (2017.01)
  *G06T 7/521*    (2017.01)
  *G06T 7/593*    (2017.01)
(52) U.S. Cl.
  CPC .............. *G06T 7/521* (2017.01); *G06T 7/593* (2017.01); *G06T 19/006* (2013.01)
(58) Field of Classification Search
  USPC ....................................................... 382/106
  See application file for complete search history.

(56) References Cited

U.S. PATENT DOCUMENTS

| | | |
|---|---|---|
| 2017/0278221 A1 | 9/2017 | Ji et al. |
| 2017/0366801 A1 | 12/2017 | Horesh |
| 2018/0024343 A1* | 1/2018 | Chenegros ............. G01N 21/53 600/479 |
| 2018/0137639 A1 | 5/2018 | Zou et al. |
| 2018/0173986 A1* | 6/2018 | Gousev ............. G06K 9/00617 |
| 2019/0045173 A1 | 2/2019 | Hicks |

OTHER PUBLICATIONS

Fanello, S., et al., "UltraStereo: Efficient Learning-based Match for Active Stereo Systems," Computer Vision Foundation, CVPR 2017, Jul. 21-26, 2017, 10 pages.

Zou, et al., "Robust Dense Depth Map Estimation from Sparse DVS Stereos," 2017, 11 pages.

European Patent Office, "Supplementary European Search Report" dated Mar. 16, 2021, in connection with European Patent Application No. 19806819.9, 7 pages.

Martel, et al., "An Active Approach to Solving the Stereo Matching Problem using Event-Based Sensors", 2018 EEE International Symposium on Circuits and Systems (ISCAS), May 4, 2018, 5 pages.

Dekiff, et al., "Three-dimensional data acquisition by digital correlation of projected speckle patterns", Applied Physics B; Lasers and Optics, Springer, Berlin, DE, Mar. 17, 2020, 8 pages.

Leung, et al., "Toward a large-scale multimodal event-based dataset for neuromorphic deep learning applications", Proceedings of SPIE vol. 10639,106391T-1, May 14, 2018, 10 pages.

* cited by examiner

FIG. 9
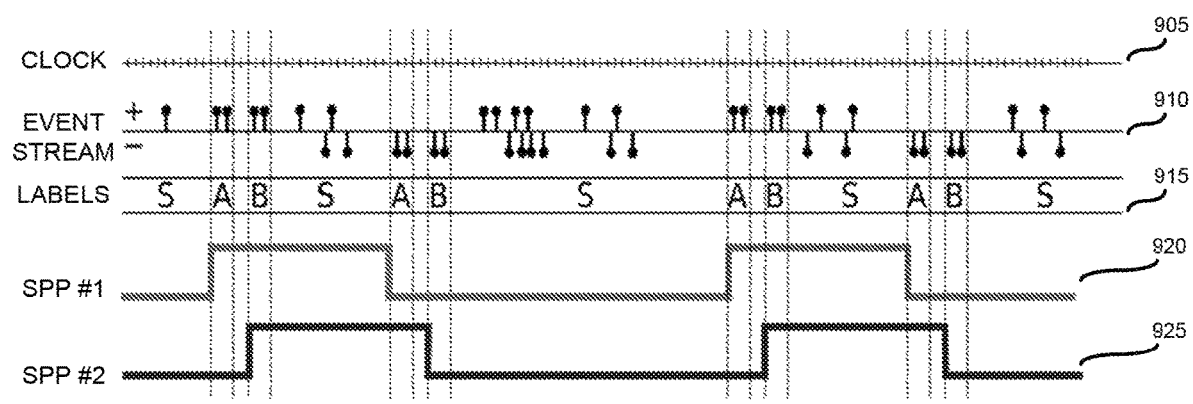
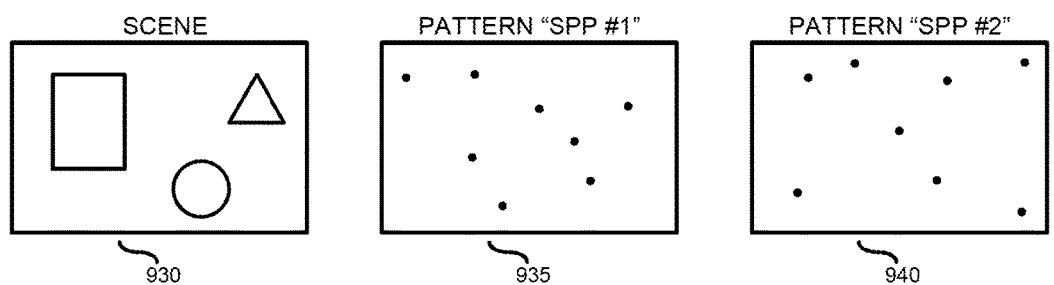

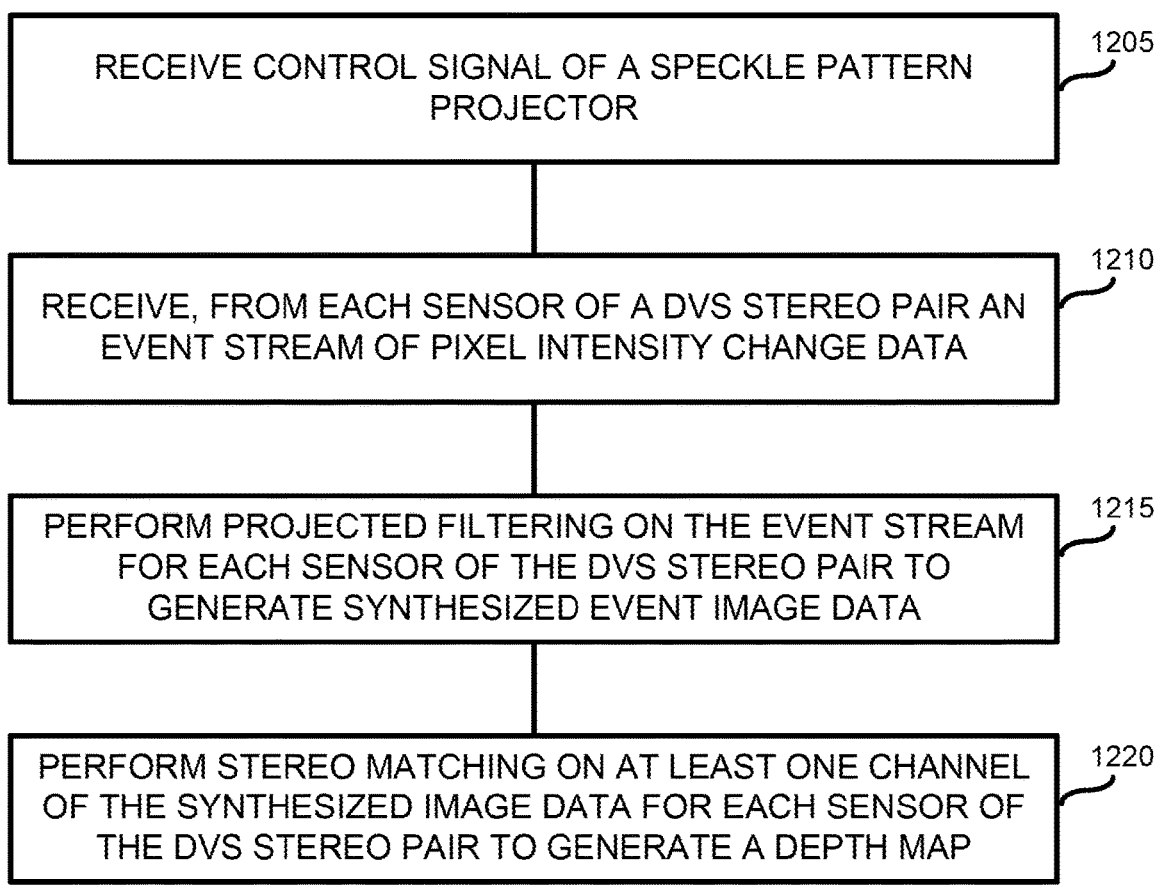

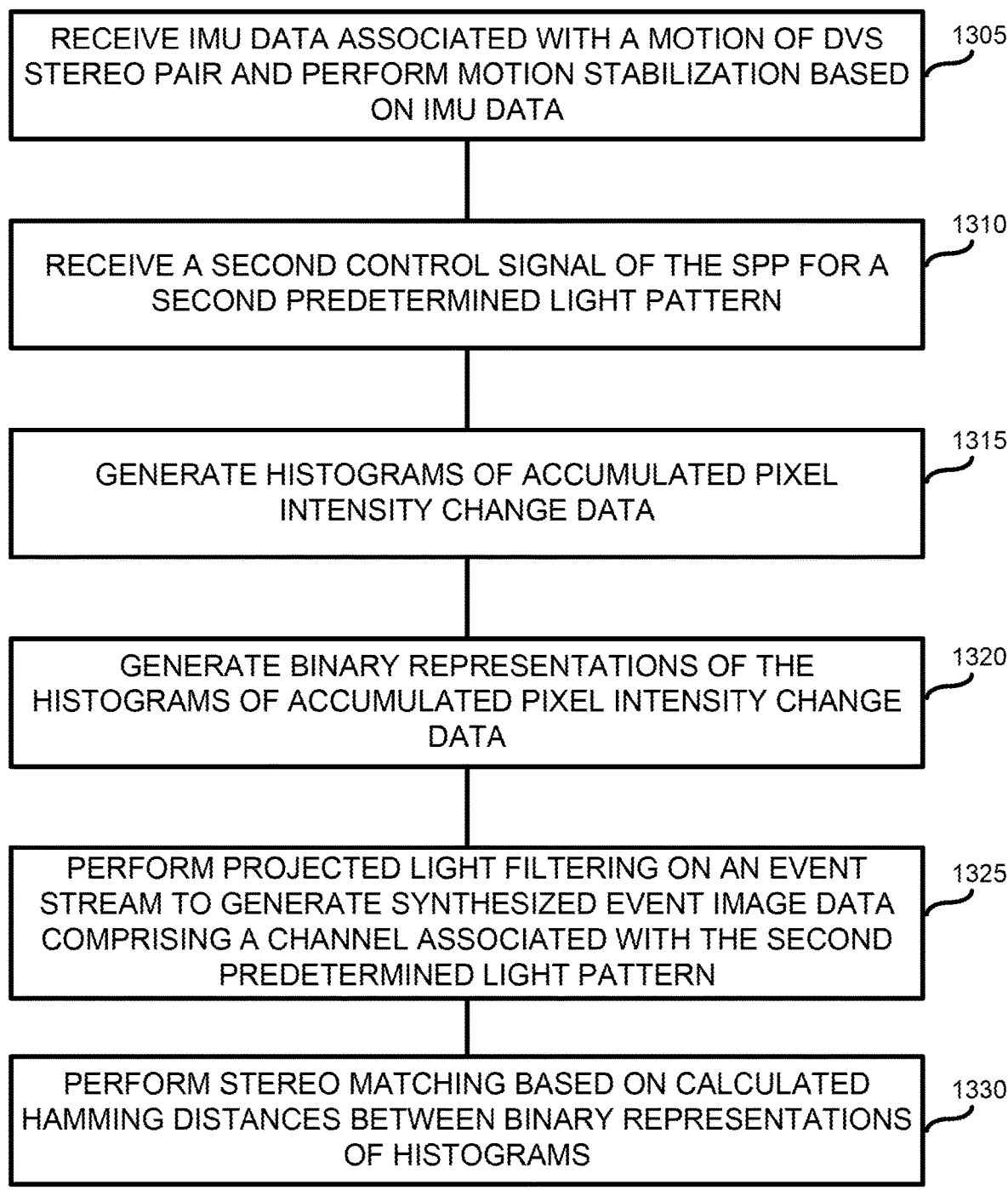

SEMI-DENSE DEPTH ESTIMATION FROM A DYNAMIC VISION SENSOR (DVS) STEREO PAIR AND A PULSED SPECKLE PATTERN PROJECTOR

CROSS-REFERENCE TO RELATED APPLICATION AND CLAIM OF PRIORITY

This application claims priority under 35 U.S.C. § 119(e) to U.S. Provisional Patent Application No. 62/676,844 filed on May 25, 2018. The above-identified provisional patent application is hereby incorporated by reference in its entirety.

TECHNICAL FIELD

This disclosure relates generally to computer vision. More specifically, this disclosure relates to systems and methods for semi-dense depth estimation from a Dynamic Vision Sensor (DVS) stereo pair and a pulsed speckle pattern projector.

BACKGROUND

Depth estimation is a central problem in computer vision. Determinations of depth are fundamental to many applications, such as facial recognition, face tracking, camera pose estimation and geometric modeling of scenes which drive many augmented (AR) applications.

The technical challenges associated with implementing depth estimation include, without limitation, simultaneously pushing the performance envelope of depth estimation across multiple dimensions of system performance, such as latency, processor power consumption, performance across varying light conditions and the ability to accurately estimate depth in the absence of motion in the frame of the sensor.

Often, robustness of performance, speed and low processor power consumption adhere to an "iron triangle" relationship, whereby a sensor or system can only have, at most, two of these three desirable performance properties. Thus, simultaneous improvement of the performance of depth estimation systems across multiple performance parameters remains a source of technical challenges and opportunities for improvement in the field of computer vision.

SUMMARY

This disclosure provides systems and methods for semi-dense depth estimation from a Dynamic Vision Sensor (DVS) stereo pair and a pulsed speckle pattern projector.

In a first embodiment, a method for semi-dense depth estimation includes receiving, at an electronic device, a control signal of a speckle pattern projector (SPP), the control signal indicating an on/off state, as a function of time, of a predetermined light pattern projected by the SPP on a field of view and receiving from each sensor of a dynamic vision sensor (DVS) stereo pair, an event stream of pixel intensity change data, wherein the event stream is time-synchronized with the control signal of the SPP and includes a first portion associated with light from a scene in the field of view and a second portion associated with the predetermined light pattern projected by the SPP. The method further includes performing projected light filtering on the event stream of pixel intensity change data for each sensor of the DVS stereo pair, to generate synthesized event image data, the synthesized event image data having one or more channels, each channel based on an isolated portion of the event stream of pixel intensity change data and performing stereo matching on at least one channel of the synthesized event image data for each sensor of the DVS stereo pair to generate a depth map for at least a portion of the field of view.

In a second embodiment, an apparatus includes a speckle pattern projector, a dynamic vision sensor (DVS) stereo pair, a processor and a memory. Further, the memory contains instructions, which, when executed by the processor, cause the apparatus to receive, a control signal of the SPP, the control signal indicating an on/off state, as a function of time, of a predetermined light pattern projected by the SPP on a field of view and to receive, from each sensor of the dynamic vision sensor (DVS) stereo pair, an event stream of pixel intensity change data, wherein the event stream is time-synchronized with the control signal of the SPP and includes a first portion associated with light from a scene in the field of view and a second portion associated with the predetermined light pattern projected by the SPP. Additionally, the instructions, when executed by the processor, cause the apparatus to perform projected light filtering on the event stream of pixel intensity change data for each sensor of the DVS stereo pair, to generate synthesized event image data, the synthesized event image data having one or more channels, each channel based on an isolated portion of the event stream of pixel intensity change data, and to perform stereo matching on at least one channel of the synthesized event image data for each sensor of the DVS stereo pair to generate a depth map for at least a portion of the field of view.

In a third embodiment, a non-transitory computer-readable medium includes program code, which, when executed by a processor, causes an electronic device to receive, at the electronic device, a control signal of a speckle pattern projector (SPP), the control signal indicating an on/off state, as a function of time, of a predetermined light pattern projected by the SPP on a field of view and to receive, from each sensor of a dynamic vision sensor (DVS) stereo pair, an event stream of pixel intensity change data, wherein the event stream is time-synchronized with the control signal of the SPP and includes a first portion associated with light from a scene in the field of view and a second portion associated with the predetermined light pattern projected by the SPP. Additionally, the program code, when executed by the processor, causes the apparatus to perform projected light filtering on the event stream of pixel intensity change data for each sensor of the DVS stereo pair, to generate synthesized event image data, the synthesized event image data having one or more channels, each channel based on an isolated portion of the event stream of pixel intensity change data, and to perform stereo matching on at least one channel of the synthesized event image data for each sensor of the DVS stereo pair to generate a depth map for at least a portion of the field of view.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 9 illustrates an example of projected light filtering on an event stream of pixel intensity change data, as well as multi-channel histograms generated from filtered and synthesized light intensity change event streams according to certain embodiments of this disclosure;

FIG. 12 illustrates operations of a method for performing depth estimation according to various embodiments of this disclosure; and FIG. 13 illustrates operations of a method for performing depth estimation according to various embodiments of this disclosure.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
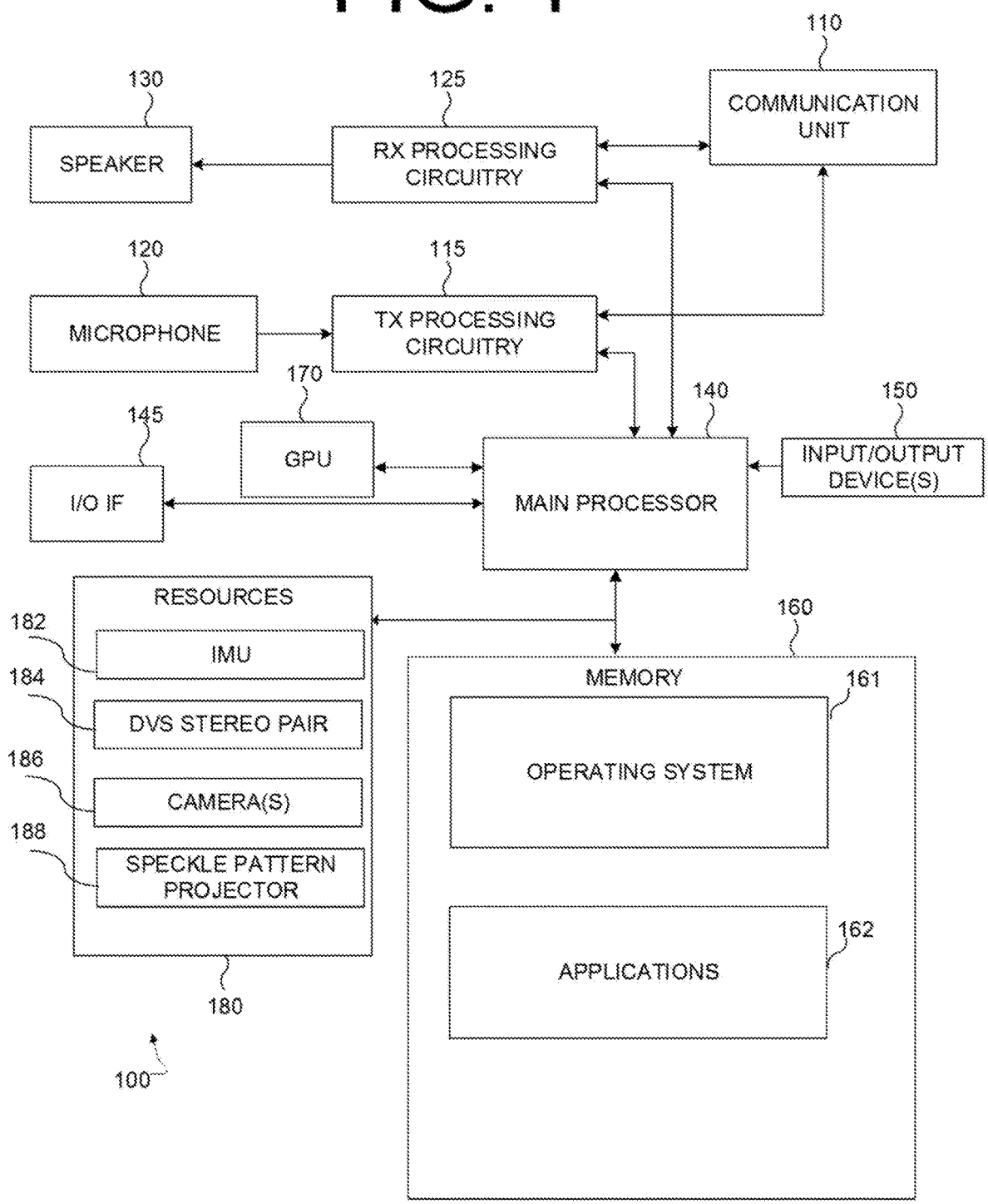
FIG. 1 illustrates an example of an electronic device for performing depth estimation according to various embodiments of this disclosure.

FIG. 1 illustrates a non-limiting example of a device for performing semi-dense depth estimation according to some embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume or otherwise utilize depth estimation data regarding physical objects in a field of view of electronic device 100.

The communication unit 110 may receive an incoming RF signal, for example, a near field communication signal such as a BLUETOOTH® or WI-FI™ signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a dynamic vision sensor (DVS) stereo pair 184, one or more cameras 186 of electronic device 100, and a speckle pattern projector (SPP) 188. According to various embodiments, DVS stereo pair 184 comprises a pair of dynamic vision sensors spaced at a stereoscopically appropriate distance for estimating depth at over a field of depth of interest. As a non-limiting example, if the field of depth of interest is close to device 100, the DVS sensors may be spaced comparatively closely, and if the field of depth of interest is far from device 100, the individual sensors of DVS stereo pair 184 may be spaced further apart. In some embodiments, SPP 188 projects a spatially non-repetitive pattern of dots of light (also known as "speckles") at one or more wavelengths which can be detected by the sensors of DVS stereo pair 184. According to certain embodiments, SPP 188 projects a pattern at a wavelength at the edge of what the human eye can see, for example, at or around ~800 nm. In various embodiments according to this disclosure SPP 188 utilizes a laser-based diffractive optical element ("DOE") to project a speckle pattern.

Although FIG. 1 illustrates one example of a device 100 for performing semi-dense depth estimation, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
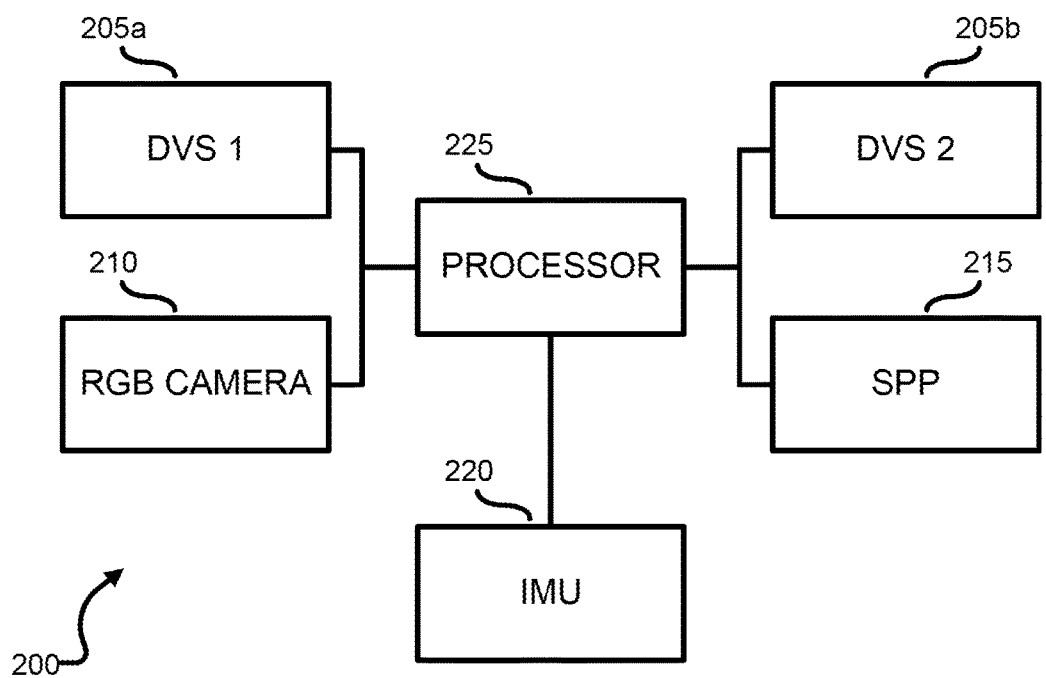
FIG. 2 illustrates an example of an apparatus for obtaining projected speckle pattern and scene data according to certain embodiments of this disclosure.

FIG. 2 illustrates an example of an apparatus 200 for obtaining projected speckle pattern and scene data according to certain embodiments of this disclosure. The components shown in the non-limiting example of FIG. 2 are in some embodiments, configured within a single device. In some embodiments, the components described with reference to FIG. 2 are implemented on physically separate, but communicatively coupled, devices.

Referring to the non-limiting example of FIG. 2, apparatus 200 comprises a first dynamic vision sensor 205a and a second dynamic vision sensor 205b, which together, comprise a DVS stereo pair. In some embodiments, apparatus 200 comprises a separate red-green-blue ("RGB") camera 210, a speckle pattern projector 215 and an inertial motion unit ("IMU") 220. As shown in this particular example, each of sensors 205-220 is communicatively connected to a processor 225.

According to certain embodiments, first dynamic vision sensor 205a and second dynamic vision sensor 205b are configured to provide stereoscopic image data over a shared portion of each sensor's field of view. In some embodiments, dynamic vision sensors 205a and 205b each comprise a lens for receiving light and a pixelated sensor upon which the received light is focused. Each pixelated sensor of dynamic vision sensors 205a and 205b is configured to generate an output in response to a change in the intensity of the light received at the sensor. The light received at the sensor includes scene light and light from SPP 215. As used in this disclosure, the term scene light encompasses light from objects within the field of view which is not provided by the SPP. Examples of scene light include, without limitation, sunlight reflected off of objects (for example, people, plants and buildings) in a scene, as well as artificial light, such as from a flash or on-camera light, used to illuminate a dark scene.

According to certain embodiments, the output of each pixelated sensor is an event stream of time-mapped binary values reflecting changes in the intensity of the light received at the sensor at known points in time (for example, "0" for a decrease in the intensity of light received at the sensor, and "1" for an increase in the intensity of light received at the sensor). In some embodiments, first and second dynamic vision sensors 205a and 205b can respond to changes in light intensity occurring at wavelengths just outside of the visible spectrum.

In some embodiments, apparatus 200 includes RGB camera 210, which is a digital camera comprising a lens for receiving light and a pixelated sensor upon which the received light is focused. According to various embodiments, the pixelated sensor of RGB camera 210 is a complementary metal oxide semiconductor (CMOS) sensor, which periodically outputs frames of raw received light data from each of pixel of the sensor. The output of RGB camera 210 is, in certain embodiments, provided to processor 225 for calibrating first and second DVS sensors 205a and 205b, and for generating image data with additional chromatic detail. According to certain embodiments, the field of view of RGB camera 210 includes at least part of the overlap in the field of view of first dynamic vision sensor 205a and second dynamic vision sensor 205b As shown in the non-limiting example of FIG. 2, apparatus 200 includes speckle pattern projector ("SPP") 215. According to certain embodiments, SPP 215 projects patterned light onto a portion of a scene falling within the stereoscopic field of first dynamic vision sensor 205a and second dynamic vision sensor 205b. As used in this disclosure, the term stereoscopic field encompasses a region of overlap in the field of view of first dynamic vision sensor 205a and the field of view of second dynamic vision sensor 205b. The patterned light projected by SPP 215 comprises a non-repeating pattern of individual light elements, such as a speckle pattern of dots, for which locations within the pattern can be identified in event stream data from each sensor of the DVS stereo pair. The pattern is pulsed according to a time-mapped control signal known to processor 225. In some embodiments, the projected speckle pattern is projected at a wavelength that is invisible to the human eye, but visible to the DVS stereo pair, thereby avoiding the distraction of seeing flickering dots on a scene.

In certain embodiments, apparatus 200 includes IMU 220, which is configured to move in concert with first and second DVS sensors 205a and 205b, and output data reflecting the motion, orientation and acceleration of apparatus 200 to processor 225. In some embodiments, IMU 220 is a six degree-of-freedom sensor, capturing acceleration data across three axes as well as rotational (yaw) acceleration across three axes. In certain embodiments, IMU 220 may have greater or fewer than six degrees of freedom.

According to certain embodiments, the data output by IMU 220 is used for motion stabilization or motion correction on the outputs from the DVS stereo pair and/or RGB camera 210. For example, while the individual pixel sensors of first and second dynamic vision sensors 205a and 205b are very fast, and configured to record events associated with changes in the intensity of light at the sensor more frequently than RGB sensors having a predetermined frame rate, such dynamic vision sensor event stream data may be aggregated over longer time scales, during which the position of apparatus 200 may change over the duration of an aggregation period. According to certain embodiments, processor 225 utilizes data from IMU 220 to compensate for changes in camera position over event aggregation intervals.

Referring to the non-limiting example of FIG. 2, processor 225 is a processor communicatively connected to each of sensors 205-220 (for example, main processor 140 in FIG. 1), and configured to execute instructions for performing semi-dense depth estimation according to certain embodiments of this disclosure. In some embodiments, processor 225 is a purpose-specific processor (for example, a programmable field gate array, or system on a chip ("SOC") device) specifically configured to perform depth estimation and output depth estimation and image data from a DVS stereo pair and/or RGB camera 210 to another processor.

Figure 3:
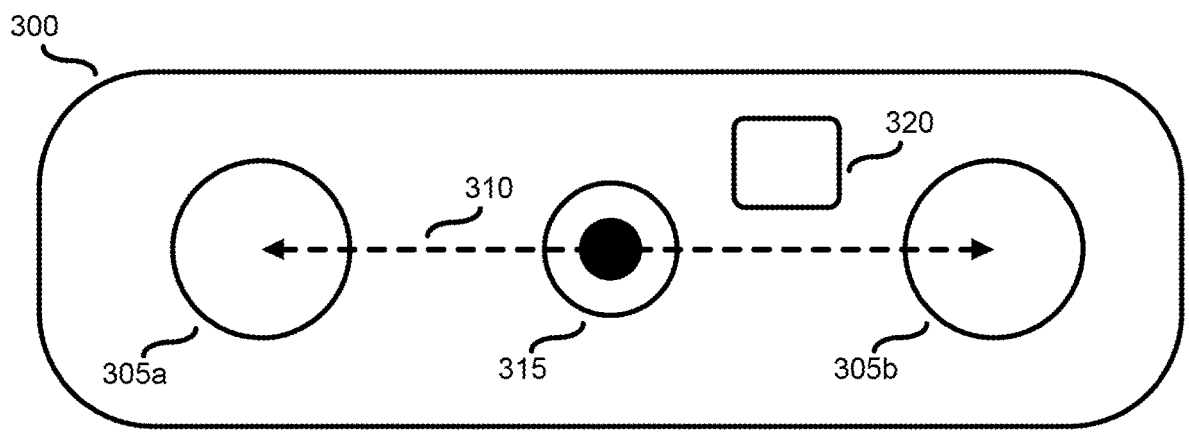
FIG. 3 illustrates an example of a sensor configuration in an apparatus for obtaining projected speckle pattern and scene data according to some embodiments of this disclosure.

FIG. 3 illustrates an example of a sensor configuration in an apparatus 300 for obtaining projected speckle pattern and scene data according to certain embodiments of this disclosure. In this illustrative example, apparatus 300 is depicted from the perspective over a viewer in the stereoscopic field of apparatus 300.

Referring to the non-limiting example of FIG. 3, apparatus 300 includes a first sensor 305a of a DVS stereo pair, a second sensor 305b of a DVS stereo pair, a speckle pattern projector 315, and an internal motion unit sensor 320.

According to certain embodiments, first sensor 305a and second sensor 305b are each DVS sensors comprising a lens and an array of pixelated sensors, each of which configured to provide a time-mapped event stream of changes in the intensity of light at the sensor. As shown in the illustrative example of FIG. 3, first sensor 305a and second sensor 305b are separated by a distance 310, which is a stereoscopically appropriate distance for performing stereo matching and depth estimation over a field of depth of interest. In some embodiments, apparatus 300 may be configured to adjust distance 310 depending on the field of depth of interest (for example, by increasing distance 310 to increase a parallax angle for distant objects). According to various embodiments, apparatus 300 may include three or more DVS sensors disposed a polygonal fashion on the face of apparatus 300, thereby providing a variety of parallax axes and distances between sensors.

As shown in the non-limiting example of FIG. 3, SPP 315 is depicted as residing squarely between first sensor 305a and second sensor 305b along a common centerline. Embodiments according to this disclosure are not so limited, and SPP 315 may be positioned at generally any location where it can project a light pattern (for example, a light pattern pulsed on and off according to a time-synchronized control signal) into the stereographic field.

According to certain embodiments, IMU 320 is placed close to first sensor 305a and second sensor 305b and coplanar with the DVS stereo pair. In some embodiments, IMU 320 is located anywhere within apparatus 300, where the movement data obtained by IMU 320 reflects the motion of the DVS stereo pair.

Figure 4:
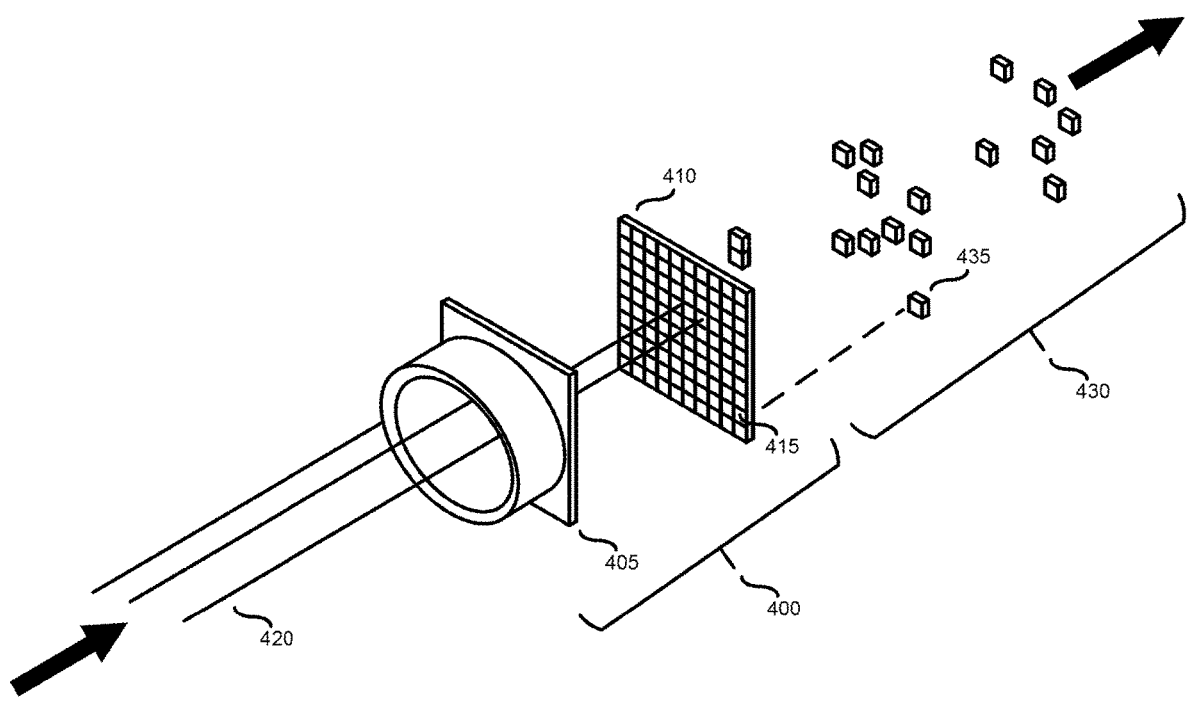
FIG. 4 illustrates aspects of the operation of a dynamic vision sensor according to certain embodiments of this disclosure.

FIG. 4 illustrates aspects of the operation of a dynamic vision sensor ("DVS") 400 according to certain embodiments of this disclosure. The embodiment shown in FIG. 4 is for illustration only and other embodiments could be used without departing from the scope of the present disclosure.

Referring to the non-limiting example of FIG. 4, DVS 400 is, in certain embodiments, one sensor of a DVS stereo pair. In some embodiments, DVS 400 is one sensor of a set of three or more DVS sensors (for example, a set of DVS sensors disposed along multiple parallax angles, and at multiple sensor spacings). In certain embodiments, DVS 400 is a single DVS sensor.

According to various embodiments, DVS 400 comprises a lens assembly 405, and a pixelated array 410 of light intensity sensors, such as light intensity sensor 415. In some embodiments, lens assembly 405 comprises an optical lens having a focal length corresponding to a distance between lens assembly 405 and pixelated array 410. In various embodiments according to this disclosure, lens assembly 405 comprises an aperture for adjusting (such as by stepping down an f-stop) the overall intensity of light provided to pixelated array 410.

As shown in the non-limiting example of FIG. 4, pixelated array 410 of light intensity sensors comprises an array of light intensity sensors (for example, light intensity sensor 415) substantially covering an area in the focal plane of a lens in lens assembly 405. Further, the output each light intensity sensor of pixelated array 410 is mapped to a spatial coordinate value.

In some embodiments, light intensity sensor 415 comprises a photo sensor configured to output a signal corresponding to a direction of change in the measured intensity of light received at light intensity sensor 415. According to certain embodiments, the output of light intensity sensor is a binary signal, for example "1" for an increase in the measured intensity of light, and "0" for a decrease in the measured intensity of light. When there is no changed in the measured intensity of light at light intensity sensor 415, no signal is output. According to certain embodiments, signals output by light intensity sensor 415 are time-coded or time-mapped to a time value by pixelated array 410 or by another downstream component (such as processor 225 in FIG. 2).

Referring to the non-limiting example of FIG. 4, at a high level, DVS 400 operates by receiving light 420 through lens assembly 405, and converting the received light into one or more time coded, or time-synchronized event stream 430, by using the output of the constituent light intensity sensors of pixelated array 410.

According to various embodiments, event stream 430 comprises a time-coded or time-synchronized stream of light intensity change events output by light intensity sensors of pixelated array 410. An individual light intensity change event 435 comprises data indicating a change (for example, an increase or decrease) in the measured intensity of the light measured at a particular light intensity sensor (e.g., a pixel) of pixelated array 410. For example, in this illustrative example, light intensity change event 435 corresponds to a change in the measured light intensity at light intensity sensor 415. Further, each individual light intensity change event 435 is time-coded or otherwise mapped to an event time based on a common timescale for each sensor of pixelated array 410. In some embodiments, each individual light intensity change event 435 is also mapped to a value in a spatial coordinate system (for example, a coordinate system based on the rows and columns of pixelated array 410).

Figure 5:
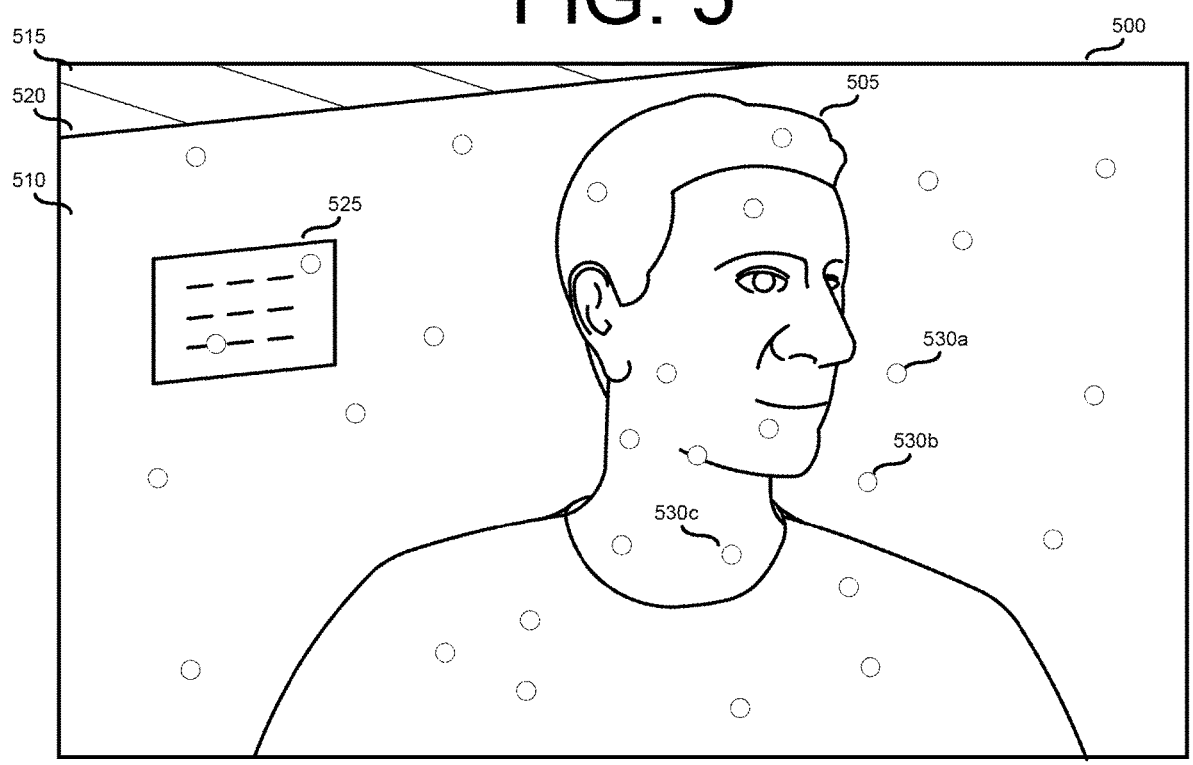
FIG. 5 illustrates an example of a speckle pattern projected on to a scene comprising a subject and background, according to various embodiments of this disclosure.

FIG. 5 illustrates an example of a speckle pattern projected onto a scene which comprises a subject and a background. The embodiment shown in FIG. 5 is for illustration only and other embodiments could be used without departing from the scope of the present disclosure.

Referring to the non-limiting example of FIG. 5, scene 500 depicts objects from the perspective of the stereoscopic field of a DVS stereo pair. In this particular example, the foreground of scene 500 comprises a ¾ (or "head and shoulders") view of a static subject and the background of scene 500 comprises an off-axis view of a flat wall 510 and ceiling 515. As indicated by the intersection line 520 of the wall and ceiling, the perspective of the DVS stereo pair is such that vanishing point (not shown) is off to the lower left of the figure, meaning that portions of wall 510 on the left hand side of scene 500 are farther from the DVS stereo pair than portions of wall 510 on the right hand side of scene 500. In this non-limiting example, wall 510 is generally featureless, except for placard 525 on wall 510. An SPP (for example, SPP 315 in FIG. 3) has projected speckles of light, including speckles 530a, 530b, and 530c, on both the foreground and background of scene 500. According to various embodiments, speckles 530a, 530b, and 530 comprise elements of a non-repeating pattern of points of light at a wavelength which is visible, at a minimum, to the sensors of a DVS stereo pair. According to some embodiments, speckles 530a, 530b, and 530c are also visible to the human eye. However, in some embodiments, speckles 530a, 530b, and 530c are invisible to the human eye, as discussed above.

Scene 500 presents several technical challenges for any apparatus attempting to perform depth estimation of the features of subject 505 and wall 510. As one example of the technical challenges posed by scene 500, with the exception of placard 525, wall 510 is a generally featureless surface, such as a section of drywall to which a layer of primer has been applied. This paucity of features makes can make estimation of the distance between a DVS stereo pair and a point on wall 510 based on scene light very difficult. This is because stereo matching data from one sensor of a DVS stereo pair to the other sensor of the DVS stereo pair can be very difficult, if not outright impossible when one patch of wall 510 appears identical to many other patches of wall 510.

As another example of the technical challenges associated with performing depth estimation on scene 500, subject 505 is static. Depth estimation can be more readily calculated on moving subjects, because, in addition to using the parallax angle between the sensors of the DVS stereo pair as data from which depth can be estimated, a moving subject's location in the frame of a single sensor as a function of time can also provide data from which depth can be estimated.

Certain embodiments according to this disclosure address the challenges of scene 500 and even more challenging scenes (for example, a static white ball positioned in front of a white wall in a dimly lit room) to provide, at a minimum, for a wide range of scene elements and light conditions, semi-dense depth estimates. As used in this disclosure, the term semi-dense depth estimate encompasses an estimate of the depth of at least some of the points in a scene. Depending on, for example, the density of features in a scene, and the density of dots of light in a projected speckle pattern, depth estimates for more points in the scene may be calculated, and a denser depth estimate obtained.

Figure 6:
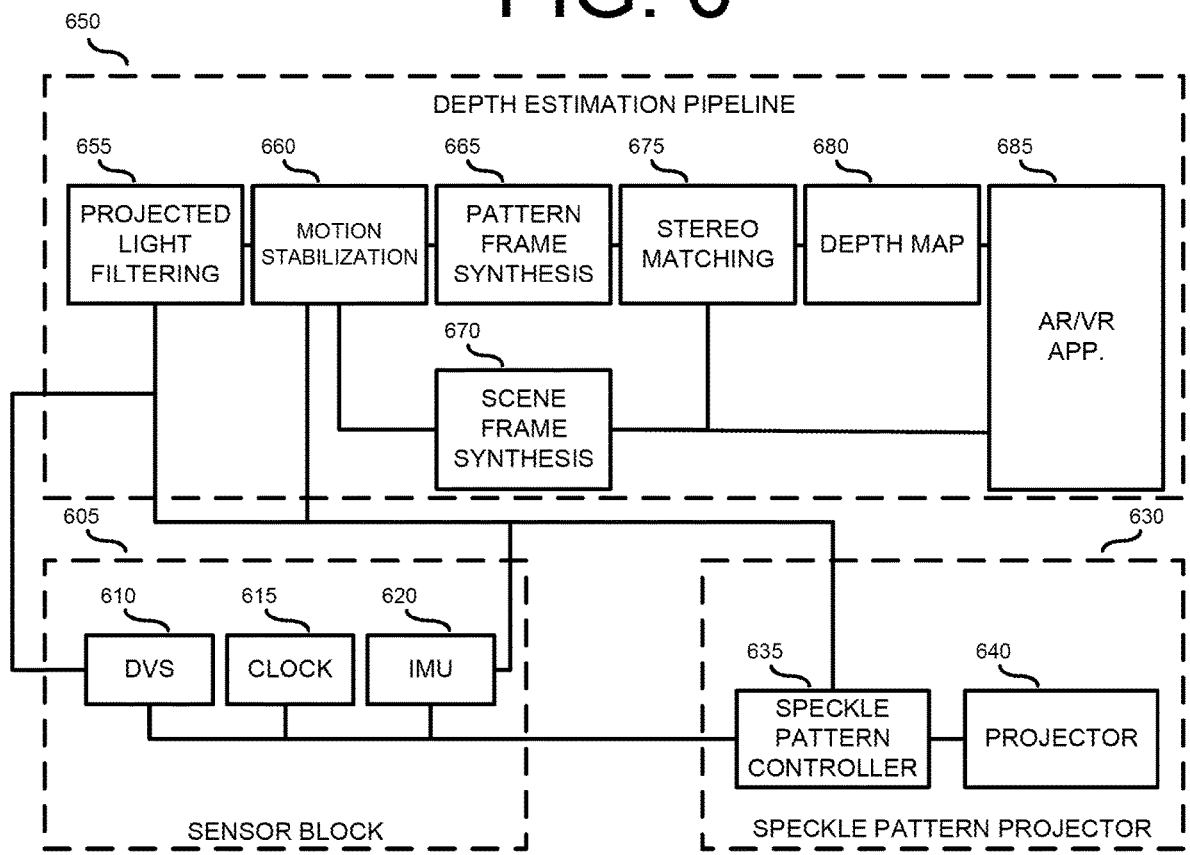
FIG. 6 illustrates an example of components for implementing semi-dense depth estimation from a dynamic vision sensor stereo pair and a pulsed speckle pattern projector, according to at least one embodiment of this disclosure.

FIG. 6 illustrates an example of components for implementing semi-dense depth estimation from a dynamic vision sensor stereo pair and a pulsed speckle pattern projector according to various embodiments of the present disclosure.

Referring to the non-limiting example of FIG. 6, a system for implementing semi-dense depth estimation comprises a sensor block 605, a speckle pattern projector (SPP) 630 and a depth estimation pipeline 650. The embodiment shown in FIG. 6 is for illustration only and other embodiments could be used without departing from the scope of the present disclosure.

Referring to the non-limiting example of FIG. 6, sensor block 605 comprises DVS stereo pair 610, clock 615 and IMU sensor 620. According to various embodiments, DVS stereo pair 610 is a pair of DVS sensors (for example, sensor 400 in FIG. 4), wherein each DVS sensor has its own field of view, and the DVS sensors of DVS stereo pair 610 are spaced such that their respective fields of view overlap to produce a stereoscopic field. As shown in the non-limiting example of FIG. 6, DVS stereo pair 610 is connected to clock 615 and the projected light filtering stage 655 of depth estimation pipeline 650. In this illustrative example, DVS stereo pair 610 outputs one or more event streams of pixel intensity change data, wherein each event stream is time synchronized with a control signal for speckle pattern projector 630.

In certain embodiments, clock 615 is a common clock for assigning time values to light intensity change events (for example, light intensity change event 435 in FIG. 4) in the event streams from each sensor of DVS stereo pair 610, as well as time values for the on/off state of a predetermined light pattern projected by the SPP on a field of view (for example, the stereoscopic field of DVS stereo pair 610). According to various embodiments, clock 615 also time codes, or assigns time values to motion event data from IMU 620. In some embodiments, clock 615 has a clock speed of 1 megahertz (1 MHz) or greater, reflecting the fact that, in certain embodiments, the sensors of DVS stereo pair 610 can respond to changes in the received intensity of light on microsecond time scales.

As shown in the non-limiting example of FIG. 6, IMU 620 is connected to clock 615 and projected light filtering stage 655 of depth estimation pipeline 650. According to various embodiments, IMU 620 provides depth estimation pipeline 650 with time-synchronized acceleration and orientation data for performing motion stabilization and correction for changes in vantage point.

According to various embodiments, speckle pattern projector 630 comprises speckle pattern controller 635 and projector 640. In various embodiments, speckle pattern controller 635 controls an on/off state of one or more speckle patterns of light projected into some or all of the stereoscopic field of DVS pair 610. In some embodiments, speckle pattern controller 635 is implemented as software executed by a separate processor (for example, main processor 140 in FIG. 1). In certain embodiments, speckle pattern controller 635 is implemented as a purpose-specific controller for projector 640. According to various embodiments, speckle pattern controller 635 pulses speckled light projected into the stereoscopic field between an "on" state and an "off" state according to a control signal which is time-synchronized to common clock 615. According to various embodiments, the control signal of speckle pattern controller 635 is provided to both speckle projector 640 and the projected light filtering stage 655 of depth estimation pipeline 650.

Referring to the non-limiting example of FIG. 6, projector 640 comprises a light source which projects one or more non-repeating patterns of points of light ("speckles") into some portion of the field of view of at least one sensor of DVS stereo pair 610 (for example, the stereoscopic field of DVS stereo pair 610). In certain embodiments, projector 640 comprises a diffractive optical element ("DOE") and a laser which is switched between an "on" state and an "off" state according to a control signal from speckle pattern controller 635.

In certain embodiments according to this disclosure, depth estimation pipeline 650 comprises a series of processing stages, which in this illustrative example, are numbered 655 through 680, and produce a depth map or depth data which, in certain embodiments, are consumed, or utilized by an augmented reality (AR) or virtual reality (VR) application. According to certain applications, each stage of depth estimation pipeline 650 is implemented as a module of program code in a computer program executed by a processor (for example, main processor 140 in FIG. 1). In some embodiments, each stage of depth estimation pipeline 650 is implemented via processing logic implemented in hardware (for example, as a programmable field gate array or system on a chip "SOC"). In certain embodiments, depth estimation pipeline is implemented through a combination of hardware and software modules.

Referring to the non-limiting example of FIG. 6, depth estimation pipeline includes a projected light filtering stage 655, which receives time synchronized (by, for example, assigning event times from common clock 615) event stream data from DVS stereo pair 610, speckle pattern control signal data from speckle pattern controller 635, and IMU 620. As received by projected light filtering stage 655, the event stream for each individual light intensity change sensor (for example, light intensity sensor 415) comprises a set of time coded events associated with one or more of scene light, switching one or more speckle patterns on and off. According to various embodiments, projected light filtering stage 655 labels each of the time-coded events of each event stream as being associated with scene light, or light associated with the pulsing of a particular speckle pattern. In some embodiments, projected light filtering stage 655 separates each event stream into channels associated with the labels, such as a "scene" channel or a "first speckle pattern" channel.

According to various embodiments, depth estimation pipeline 650 includes motion stabilization stage 660. As discussed with respect to pattern frame synthesis and scene frame synthesis stages 665 and 670, in certain embodiments, multiple streams of event stream data are accumulated (for example, in a buffer) and synthesized over specified time intervals to generate synthesized event image data. According to various embodiments, the synthesized event image data comprises multi-channel histograms. Each multi-channel histogram comprises a spatially mapped representation of the light belonging to a specified channel (for example, scene light, or light from a projected speckle pattern)

received at one of the DVS sensors of DVS stereo pair 610. In certain embodiments, the length of the specified interval may be such that the motion of DVS stereo pair 610 over the interval degrades the image quality of the multi-channel histograms, such as by introducing blur or other motion-related effects (for example, effects associated with DVS stereo pair 610 moving closer to, or further away from, objects in the stereoscopic field). In some embodiments, motion stabilization stage 660 aggregates time-synchronized motion data from IMU 620 to determine motion stabilization corrections to be applied to multi-channel histograms generated at pattern frame synthesis stage 665 and scene frame synthesis stage 670.

As shown in the non-limiting example of FIG. 6, depth estimation pipeline 650 includes pattern frame synthesis stage 665. According to certain embodiments, pattern frame synthesis stage 665 receives the output of projected light filtering stage 655 and motion stabilization stage 660. The pattern frame synthesis stage 665 accumulates and synthesizes the output of projected light filtering stage 655, and applies corrections determined by motion stabilization stage 660 to generate one or more channels of synthesized event image data. According to various embodiments, the synthesized event image data comprises, for each speckle pattern projected into the stereoscopic field, a multi-dimensional histogram (for example, histograms 935 and 940 of FIG. 9) which provides a spatial representation of how the light associated with the projected speckle pattern (in certain embodiments, the scene light is excluded from the histogram) is received at a DVS sensor of DVS stereo pair 610. As shown in the non-limiting example of FIG. 1, at least two multi-dimensional histograms (one for each sensor of DVS stereo pair 610) are generated, so that depth estimation may be performed based on stereo matching of histograms.

Referring to the non-limiting example of FIG. 6, scene frame synthesis stage 670 receives the outputs of projected light filtering stage 655 and motion stabilization stage 660, and accumulates and synthesizes, for each DVS sensor of DVS stereo pair 610, light intensity change events, to generate two sets of synthesized image event data (one set for each DVS sensor of DVS stereo pair 610) based on scene light. According to various embodiments, the synthesized image event data comprises two multi-dimensional histograms (such as histogram 930 in FIG. 9) which, depending on conditions, settings and computational resources, may be stereo matched to obtain depth map data. As discussed elsewhere in this disclosure, in cases where the scene is largely featureless (for example, a white object in front of a smooth white wall in a room illuminated by a diffused light source, such as a flash bounced off a ceiling or a large soft box), or to conserve resources, scene frame synthesis stage 670 may be omitted, and semi-dense depth estimation based only on stereoscopic analysis of synthesized event image data from projected light patterns may be performed instead.

According to various embodiments, depth estimation pipeline 650 includes stereo matching stage 675. In some embodiments, for a given channel (for example, a first projected speckle pattern) of synthesized event image data, the synthesized event image data for a first DVS of DVS stereo pair 610 is mapped to the synthesized event image data for a second DVS of DVS stereo pair 610, to identify the locations of image features (for example, representations of projected speckles, or objects appearing in a scene) within the synthesized event image data. According to various embodiments, at stereo matching stage 675, for each channel of the synthesized event image data, a patch scan of a histogram from each DVS sensor's synthesized data is performed to identify matching image patches in each histogram. In certain embodiments, the identification of matching image patches in each histogram can be performed by first generating a binary representation of the synthesized event image data in the patches, and then calculating the Hamming distance between patches. In this way, matching image patches can be recast as a search problem to identify patches with the lowest calculated Hamming distances.

Referring to the non-limiting example of FIG. 6, depth estimation pipeline 650 includes depth mapping stage 680, wherein a depth map comprising data representing the distance of one or more locations in the stereoscopic field of DVS stereo pair 610 is calculated based on the physical distance (for example, distance 310 in FIG. 3) between the sensors of DVS stereo pair 610, the focal length of the lens of the sensors of the DVS pair, and differences in frame location between image patches mapped in stereo matching stage 675. In some embodiments, the depth map is determined by applying a lookup table to differences in frame location between image patches mapped in stereo matching stage 675. In certain embodiments, a depth map is determined through a combination of calculation and identifying values in a lookup table.

According to various embodiments, the depth map determined by depth mapping stage 680 is output to one or more augmented reality (AR) or virtual reality (VR) applications 685.

Figure 7:
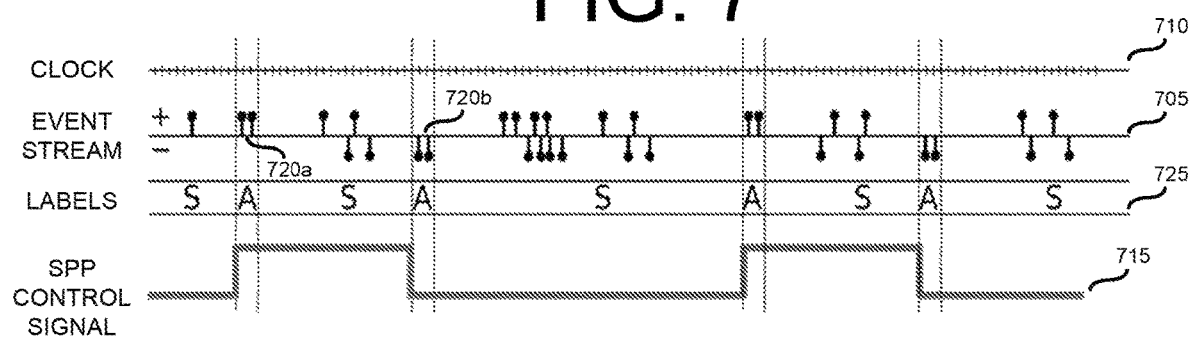
FIG. 7 illustrates an example of projected light filtering on an event stream of pixel intensity change data, according to various embodiments of this disclosure.

FIG. 7 illustrates an example of projected light filtering on an event stream of pixel intensity change data according to various embodiments of this disclosure.

Referring to the non-limiting example of FIG. 7, an event stream 705 of light change intensity from an individual sensor (e.g., a pixel) of a DVS sensor (for example, DVS 400 in FIG. 4) is shown. In this example, event stream 705 comprises events detected at the sensor during an interval in which light pattern in the field of view of the sensor was pulsed on and off. In the illustrative example of FIG. 7, the constituent events of event stream 705 are shown as upward pips, indicating an increase in the measured intensity of light at the sensor (e.g., an increase in brightness), and downward pips, indicating a decrease in the measured intensity of light at the sensor (e.g., a darkening). As shown in FIG. 7, each of these events is mapped to a timescale 710 provided by a common clock (for example, clock 615 in FIG. 6).

In some embodiments, event stream 705 includes events associated with changes in scene light, as well as events associated with the pulsing of the speckle pattern. To separate the component of event stream 705 associated with light from an SPP from scene light, projected light filtering is performed.

According to various embodiments, projected light filtering is performed by identifying conjugate sets of events occurring when the light pattern from the SPP is pulsed, and subtracting the identified events to obtain a scene light-only event stream. Referring to the non-limiting example of FIG. 7, the pulsing of the light pattern of the SPP can be determined from SPP control signal 715, which, like event stream 705, is time-synchronized, or mapped to a timescale 710 provided by a common clock. In this example, SPP control signal 715 is a square wave, whose high and low values represent the on and off states of the light pattern. According to various embodiments, events associated with light from the SPP can be identified from conjugate events occurring at the leading and trailing edges of the square wave of SPP control signal 715. For example, two positive light intensity change events 720a occur immediately after the SPP control signal 715 switches to a value associated with a "light on" state, and two negative light intensity change events 720b occur immediately after the SPP control signal 715 switches to a value associated with a "light off" state. Events 720a and 720b comprise a conjugate pair of events which, by their timing and content, can be ascribed to light generated by an SPP. By identifying such conjugate pairs, labels 725 can be assigned to light intensity change events. In this non-limiting example, events 720a and 720b are assigned the label "A," corresponding to projected speckle pattern "A." Similarly, based on their timing, other events are labeled "S," corresponding to events detected in response to scene light.

Figure 8:
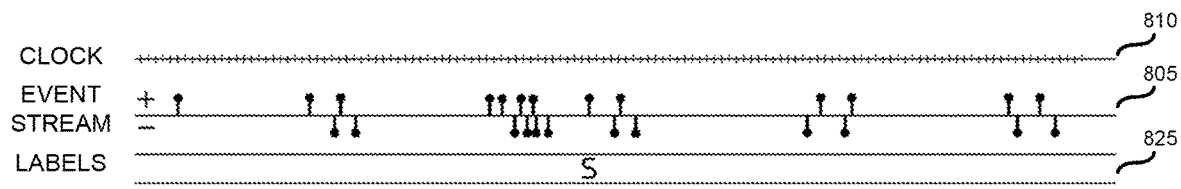
FIG. 8 illustrates an example of an event stream of scene-only pixel intensity change data obtained by performing projected light filtering according to certain embodiments of this disclosure.

FIG. 8 illustrates an example of an event stream of scene-only pixel intensity change data obtained by performing projected light filtering according to certain embodiments of this disclosure.

As shown in the non-limiting example of FIG. 8, by performing projected light filtering, an event stream of light intensity change events associated with one category, or channel, of light can be obtained. In this non-limiting example, event stream 805 is mapped to a timescale 810 (which in this non-limiting example, is the same as timescale 710 in FIG. 7), and comprises only events associated with scene light, as shown by the single "S" label 825. While not shown in FIG. 8, a similar, single-channel event stream comprising only light intensity change events associated with speckles projected by an SPP could be generated using time-based projected light filtering according to certain embodiments of this disclosure. Similarly, in certain embodiments, time-based projected light filtering as described with reference to the illustrative examples of FIGS. 7 and 8 could be performed for each pixel of each DVS of a DVS sensor pair.

FIG. 9 illustrates an example of projected light filtering on an event stream of pixel intensity change data, as well as multi-channel histograms generated from filtered and synthesized light intensity change event streams. In some embodiments, the density of a depth estimation can be increased (in the sense that the depth of more points in a scene is determined) through pulsed projection of two or more different speckle patterns on to the scene. Additionally, the confounding effects of flickering lights can, in some cases, be mitigated by projecting two or more different speckle patterns on to the scene at different pulse rates or different phases. FIG. 9 illustrates an example of time-based projected light filtering where two or more speckle patterns are projected.

Referring to the non-limiting example of FIG. 9, an event stream 910 of light intensity change events at an individual light intensity change sensor (e.g., a pixel) of a DVS sensor is shown. As in the non-limiting examples of FIGS. 7 and 8, in event stream 910 positive light change events are shown as upward pips, and negative light change events are shown as downward pips. Further, the constituent events of event stream 910 are mapped to a timescale 905 provided by a common clock (for example, clock 615 in FIG. 6). In this example, two speckle patterns "SPP #1" and "SPP #2" are pulsed on and off in the scene. The on/off state of speckle pattern "SPP #1" is represented by a first control signal 920, and the on/off state of speckle pattern "SPP #2" is represented by a second control signal 925. Each of control signals 920 and 925 are mapped to timescale 905 provided by the common clock. Here, as in the example of FIG. 7, the portions of event stream 910 associated with the respective contributions of scene light, speckle pattern "SPP #1" and speckle pattern "SPP #2" can be determined from conjugate pairs of positive and negative light intensity change events detected immediately after the leading and trailing edges of first control signal 920 and second control signal 925, and events can be assigned labels 915.

According to certain embodiments, after generating labels 915 for each event stream of each pixel of a pixelated array (for example, pixelated array 410 in FIG. 4) of a DVS array, synthesized event image data can be generated. In some embodiments, synthesized event image data comprises two-dimensional histograms providing, for each channel of light received at the DVS sensor, a two-dimensional mapping of the received light at the DVS sensor.

Referring to the non-limiting example of FIG. 9, examples, 930, 935 and 940 of histogram-format synthesized event image data from each channel of light received at a DVS sensor are provided. Histogram 930 comprises a two-dimensional mapping of the scene light as received at a DVS sensor. Histogram 935 comprises a two-dimensional mapping of light from speckle pattern "SPP #1" as received at the DVS sensor. Histogram 940 comprises a two-dimensional mapping of light from speckle pattern "SPP #2" as received at the DVS sensor.

Figure 10:
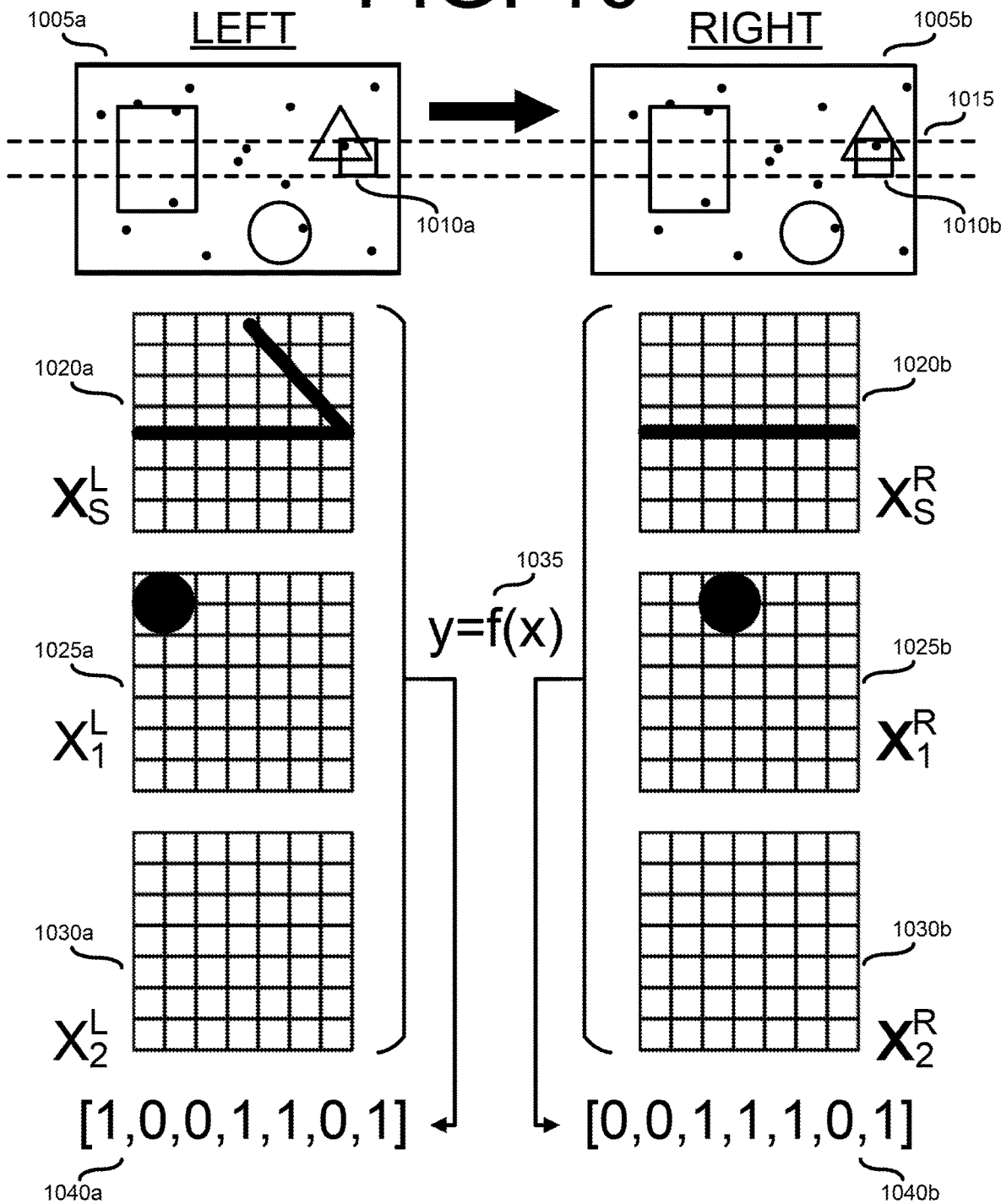
FIG. 10 illustrates an example of performing stereo matching on synthesized event image data according various embodiments of this disclosure.

FIG. 10 illustrates an example of performing stereo matching on synthesized event image data according to various embodiments of this disclosure.

Referring to the non-limiting example of FIG. 10 synthesized event image data 1005a from the left DVS of a DVS stereo pair, and synthesized event image data 1005b from the right DVS of a DVS stereo pair are shown at the top of the figure. In this non-limiting example, synthesized event image data 1005a & 1005b are represented as a superposition of two-dimensional histograms for multiple channels, such as a channel of scene light, a channel associated with a first projected speckle pattern, and a channel associated with a second projected speckle pattern.

According to certain embodiments, stereo matching (for example, as described in the non-limiting examples of FIGS. 6, 10 and 11 of this disclosure) comprises matching image patches in the histograms of "Left" synthesized event image data 1005a and "Right" synthesized event image data 1005b. In some embodiments, to save time and computational resources stereo matching comprises matching non-zero pixels in "Left" synthesized event image data 1005a to non-zero pixels in "Right" synthesized event image data 1005b.

According to certain embodiments, image patches are generated at predetermined points along a scanning pattern for both "Left" synthesized event image data 1005a and "Right" synthesized event image data 1005b. As shown in the example of FIG. 10, a patch 1010a comprising a 7×7×3 pixel "slice" of "Left" synthesized event image data 1005a, which has a coordinate value within the synthesized event image data, is taken at a point on a scanning pattern which includes scanline 1015. Similarly, patches, including patch 1010b are taken from "Right" event image data 1005b. As shown in this non-limiting example, patch 1010a and patch 1010b were obtained at the same location within a scanning pattern.

As shown in the non-limiting example of FIG. 10, patch 1010a comprises non-zero pixels in two of the three channels of light in the synthesized event image data 1005a and 1005b. For example, $X_S^L$ is a 7×7 pixel grid representation 1020a of the scene light in patch 1010a. Similarly, $X_S^R$ is a 7×7 pixel grid representation 1020b of the scene light in patch 1010b. As shown in FIG. 10, patch 1010a includes scene light from the vertex of a triangle in the field of view of a DVS sensor, while patch 1010b, obtained from the same point along scanline 1015 does not include the vertex of the triangle, reflecting the difference in perspective between the DVS sensors of a DVS sensor pair.

Additionally, patch 1010a comprises $X_1^L$, which is a 7×7 representation 1025a of light from a first speckle pattern, and $X_2^L$, which is a 7×7 representation 1030a of light from a second speckle pattern. Similarly patch 1010b comprises $X_1^R$, which is a 7×7 representation 1025b of light from a first speckle pattern, and $X_2^R$, which is a 7×7 representation 1030b of light from a second speckle pattern.

To reduce the computational load associated with identifying non-zero pixels across three channels (including the potentially pixel-rich data in the scene light channel) within "Left" synthesized event image data 1005a and "Right" synthesized event image data 1005b, the dimensionality of the representations of the patches of image data are reduced from matrices, or other 147 element representations of three 7×7 grids (e.g., 7×7×3) of pixels, to a binary representation. In the non-limiting example of FIG. 10, a compact binary representation algorithm 1035 is applied to the representations 1020a, 1025a and 1030a of each channel in patch 1010a, to obtain a binary representation 1040a of patch 1010a. Similarly, the compact binary representation algorithm 1035 is, in certain embodiments, applied to the representations 1020b, 1025b and 1030b to obtain a binary representation 1040b of the constituent channels of patch 1010b.

According to various embodiments, the distance between binary representations of patches obtained from "Left" synthesized event image data 1005a and "Right" synthesized event image data 1005b is calculated. In certain embodiments, the distance between representations is calculated based on a Hamming distance between the elements of the binary representations. In this example, the values of binary representation 1040a match the values of binary representation 1040 in five of the seven places of each binary representation, resulting in a Hamming value of two. However, a binary representation of a patch obtained from slightly to the right of patch 1010b (and including the vertex of the triangle) might result in a smaller Hamming value. In this way, stereo matching of elements in "Left" synthesized event image data 1005a and "Right" synthesized event image data 1005b becomes a search for the lowest values of the calculated distance between binary representations of patches.

Figure 11:
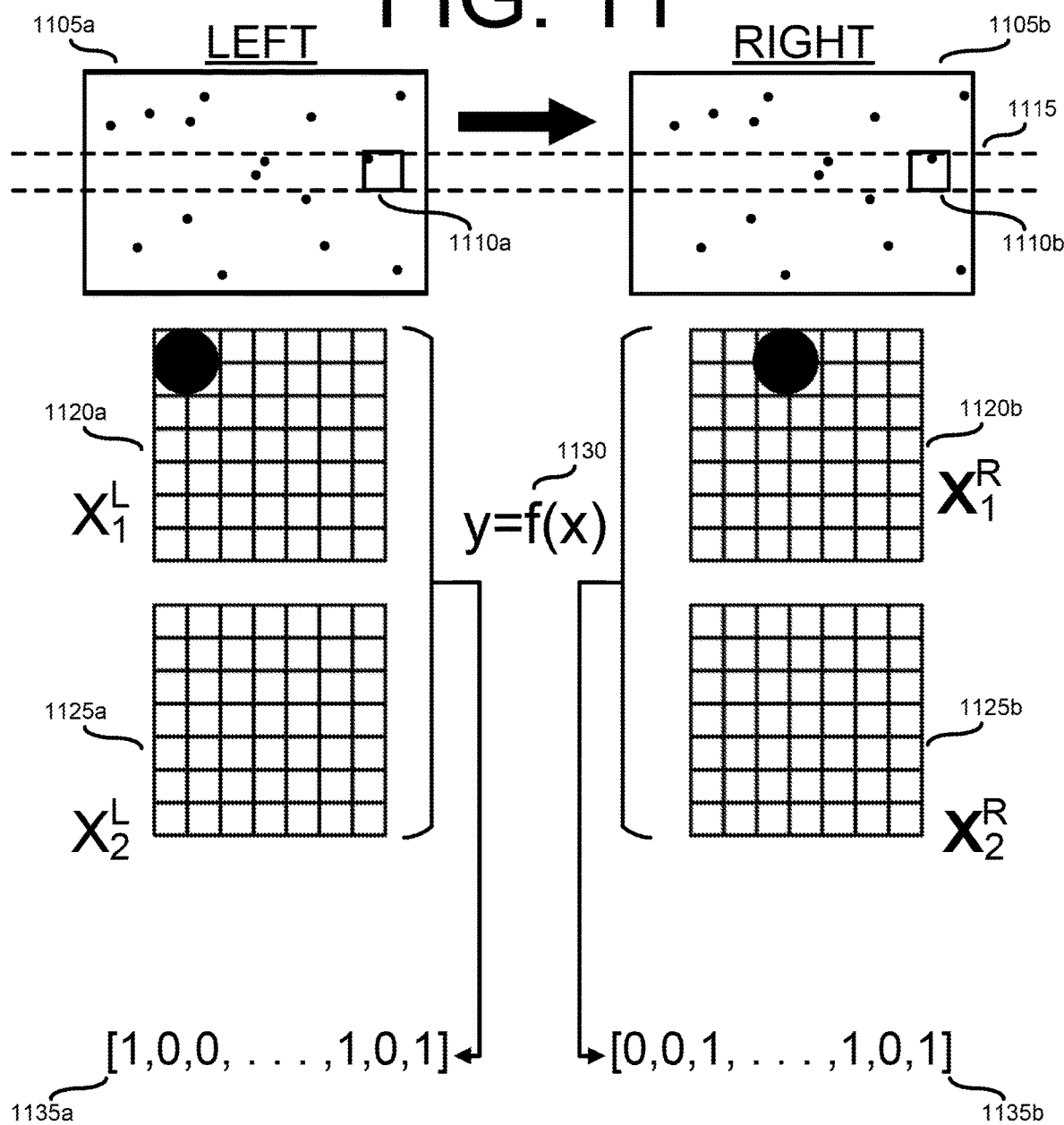
FIG. 11 illustrates an example of performing stereo matching on synthesized event image data according to some embodiments of this disclosure.

FIG. 11 illustrates an example of performing stereo matching on synthesized event image data. In certain embodiments, the speed with which stereo matching is performed, as well as battery consumption, can be improved by implementing a "low power mode" in which only synthesized event image data from projected light (thereby excluding scene light) and omitting the step of reducing the dimensionality (for example by applying compact binary representation algorithm 1035 in FIG. 10). FIG. 11 provides a non-limiting example of stereo matching in a "low power mode."

Referring to the non-limiting example of FIG. 11, synthesized event image data from each DVS of a DVS pair is shown at the top of the figure as "Left" synthesized event image data 1105a and "Right" synthesized event image data 1105b. A 7×7×2 pixel patch 1110a of "Left synthesized image data 1105a is shown as having been obtained at a predetermined location along a scanning pattern which includes scanline 1115.

As shown in the non-limiting example of FIG. 11, patch 1110a comprises non-zero pixels in one of the two channels of light in the synthesized event image data 1105a and 1105b. As shown in FIG. 11, patch 1110a comprises $X_1^L$, which is a 7×7 representation 1120a of light from a first speckle pattern, and $X_2^L$, which is a 7×7 representation 1125a of light from a second speckle pattern. Similarly patch 1110b comprises $X_1^R$, which is a 7×7 representation 1120b of light from a first speckle pattern, and $X_2^R$, which is a 7×7 representation 1125b of light from a second speckle pattern. According to various embodiments, the representations of each channel within patch 1110a are provided to a binary representation algorithm 1130, which generates a binary representation 1135a. As depicted in the non-limiting example of FIG. 11, binary representation 1135a can be generated without undergoing a dimensionality reduction process with respect to the 7×7×2 patch 1110a. Similarly, the binary representations of each channel within patch 1110b are provided to binary representation algorithm 1130, which generates a second binary representation 1135b of patch 1110b. Depending on the channels and available processing resources, it can be computationally less expensive to perform stereo matching based on calculating the distances between unreduced binary representations of certain channels, rather than stereo matching based on dimensionally reduced binary representations of all of the channels.

According to certain embodiments, having obtained binary representations 1135a and 1135b, the distance between elements within patches is calculated. According to certain embodiments, the distance is calculated based on the Hamming distance or as the sum of squares. After calculating distances across a patch set obtained from "Left" synthesized event image data 1105a and the patch set obtained from "Right" synthesized event image data 1105b, stereo matching can be treated as a search problem to identify, for each patch from "Left" synthesized event image data 1105a, the patch from "Right" synthesized event image data 1105b.

FIG. 12 illustrates operations of a method 1200 for performing depth estimation according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by, for example, main processor 140.

Referring to the non-limiting example of FIG. 12, method 1200 includes operation 1205, wherein a processor (for example, main processor 140, or a dedicated depth estimation apparatus, such as a system on a chip (SOC)) receives a control signal (for example, control signal 920 in FIG. 9). According to various embodiments, the control signal indicates the on/off state of a predetermined light pattern (for example, the speckle pattern depicted in FIG. 5) projected by an SPP on a field of view (for example, the stereoscopic field of a DVS stereo pair).

In certain embodiments, method 1200 includes operation 1210, wherein the processor receives, from each sensor of a DVS stereo pair (for example, DVS stereo pair 610 in FIG. 6), an event stream (for example, event stream 705 in FIG. 7) of pixel intensity change data. According to certain embodiments, the event stream is time-synchronized, for example, by being time-stamped on a common timescale (such as timescale 905 in FIG. 9) with the control signal of the SPP. Further, the event stream comprises a first portion associated with light from a scene in the field of view (for example, events labeled "S" in labels 915 of FIG. 9) and a second portion associated with the predetermined light pattern projected by the SPP.

According to various embodiments, method 1200 includes operation 1215, wherein the processor performs projected light filtering (for example, by identifying conjugate pairs of events following the trailing and leading edges of an SPP control signal) to generate synthesized event image data. According to certain embodiments, the synthesized event image data has one or more channels (for example, the channels represented by histograms 930, 935 and 940 in FIG. 9), each of which is based on an isolated portion of the event stream of pixel intensity change data (for example, isolated portions of event stream 430 in FIG. 4).

Referring to the non-limiting example of FIG. 12, method 1200 further includes operation 1220, wherein the processor performs stereo matching on at least one channel (for example, a channel associated with a first speckle pattern, in synthesized event image data 1105*a* and 1105*b* in FIG. 11) to obtain a depth map (for example, as performed by depth mapping stage 680 of depth estimation pipeline 650 in FIG. 6) for at least a portion of a field of view.

FIG. 13 illustrates operations of a method for performing depth estimation according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by, for example, main processor 140. In certain embodiments, some, or all, of the operations described with reference to FIG. 13 are performed in conjunction with the operations of method 1200 of FIG. 12.

Referring to the non-limiting example of FIG. 13, at operation 1305, a processor (or dedicated depth estimation unit) receives IMU data (for example, from IMU 620 in FIG. 6) indicating the motion and/or change of orientation of the DVS stereo pair. According to certain embodiments, the IMU data is time synchronized with an event stream of pixel intensity change data (for example, by being time-mapped to a common timescale, such as timescale 905 in FIG. 9). Further, at operation 1305, the processor performs motion stabilization (for example, motion stabilization as performed by motion stabilization stage 660 of depth estimation pipeline 650) based on the IMU data.

In certain embodiments, at operation 1310, the processor receives a second control signal (for example, second control signal 925 in FIG. 9), which is associated the on/off state of a second predetermined pattern of light projected into a field of a view (for example, a stereoscopic field) of a DVS stereo pair. In certain embodiments, the second control signal turns the second predetermined pattern of light on and off at distinguishable (for example, distinguished by frequency or phase) from a first control signal.

As shown in the non-limiting example of FIG. 13, at operation 1315, the processor (or depth estimation hardware, or a combination thereof) generates synthesized event image data comprising histograms of accumulated pixel intensity change data (for example, histogram 930 in FIG. 9). According to certain embodiments, histograms generated at operation 1315 may comprise event data accumulated across each pixel of a pixelated sensor array (for example, pixelated array 410 in FIG. 4) over a predetermined interval. Further, the histograms generated at operation may be motion stabilized or otherwise corrected to offset the effects in changes of DVS sensor position and orientation over an accumulation interval.

In certain embodiments according to this disclosure, at operation 1320, in preparation for performing stereo matching, the processor generates binary representations of the histograms of accumulated pixel intensity change data determined at operation 1320. In some embodiments, the dimensionality of the binary representation is less than the dimensionality of the represented portion of the histogram (for example, as is the case for binary representation 1040*a* in FIG. 10. In various embodiments, the dimensionality of the binary representation relative to the dimensionality of the represented portion of the histogram is not reduced (for example, as is the case for binary representation 1135*a* in FIG. 11).

Referring to the non-limiting example of FIG. 13, according to various embodiments, at operation 1325, the processor performs projected light filtering on an event stream (for example, event stream 910 in FIG. 9) to generate synthesized event image data comprising a channel associated with a second predetermined light pattern (for example, the synthesized event image data of histogram 940 of FIG. 9).

According to various embodiments, at operation 1330, the processor performs stereo matching by calculating the Hamming distances between binary representations of histograms (or patches thereof) and matching patches by based on minima of the calculated Hamming distances.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for semi-dense depth estimation, the method comprising:
receiving, at an electronic device, a control signal of a speckle pattern projector (SPP), the control signal indicating an on/off state, as a function of time, of a predetermined light pattern projected by the SPP on a field of view;
receiving from each sensor of a dynamic vision sensor (DVS) stereo pair, an event stream of pixel intensity change data, wherein the event stream is time-synchronized with the control signal of the SPP and comprises a first portion associated with light from a scene in the field of view and a second portion associated with the predetermined light pattern projected by the SPP;
performing projected light filtering on the event stream of pixel intensity change data for each sensor of the DVS stereo pair, to generate synthesized event image data, the synthesized event image data having one or more channels, each channel based on an isolated portion of the event stream of pixel intensity change data; and
performing stereo matching on at least one channel of the synthesized event image data for each sensor of the DVS stereo pair to generate a depth map for at least a portion of the field of view.

2. The method of claim 1, further comprising:
receiving inertial motion unit (IMU) data associated with a motion of the DVS stereo pair, wherein the IMU data is time-synchronized with the event stream of pixel intensity change data; and
performing motion stabilization based on the IMU data.

3. The method of claim 1, further comprising:
receiving a second control signal of the speckle pattern projector (SPP), the second control signal indicating an on/off state, as a function of time, of a second predetermined light pattern projected by the SPP on the field of view; and
performing projected light filtering on the event stream of pixel intensity change data for each sensor of the DVS stereo pair, to generate synthesized event image data, synthesized event image data further comprising a channel based on a third portion of the event stream of pixel intensity change data associated with the second predetermined light pattern,
wherein the second control signal is time-synchronized with the event stream for each sensor of the DVS stereo pair.

4. The method of claim 1, wherein the electronic device operates in a low power mode, performing stereo matching on a single channel of the synthesized event image data for each sensor of the DVS stereo pair to generate the depth map for at least the portion of the field of view.

5. The method of claim 1, wherein the depth map is utilized by at least one of an augmented reality (AR) or virtual reality (VR) application.

6. The method of claim 1, wherein the synthesized event image data comprises, for each sensor of the DVS stereo pair and each channel, a histogram of accumulated pixel intensity change data.

7. The method of claim 6, further comprising:
generating, for each histogram of accumulated pixel intensity change data, a binary representation of the histogram of accumulated pixel intensity change data; and
performing stereo matching based on calculated Hamming distances between binary representations of histograms from different sensors of the DVS stereo pair in a same channel.

8. An apparatus, comprising:
a speckle pattern projector (SPP);
a dynamic vision sensor (DVS) stereo pair;
a processor; and
a memory comprising instructions, which when executed by the processor, cause the apparatus to:
receive a control signal of the SPP, the control signal indicating an on/off state, as a function of time, of a predetermined light pattern projected by the SPP on a field of view,
receive, from each sensor of the dynamic vision sensor (DVS) stereo pair, an event stream of pixel intensity change data, wherein the event stream is time-synchronized with the control signal of the SPP and comprises a first portion associated with light from a scene in the field of view and a second portion associated with the predetermined light pattern projected by the SPP,
perform projected light filtering on the event stream of pixel intensity change data for each sensor of the DVS stereo pair, to generate synthesized event image data, the synthesized event image data having one or more channels, each channel based on an isolated portion of the event stream of pixel intensity change data, and
perform stereo matching on at least one channel of the synthesized event image data for each sensor of the DVS stereo pair to generate a depth map for at least a portion of the field of view.

9. The apparatus of claim 8, further comprising:
an inertial motion unit (IMU) sensor physically connected to move with the DVS stereo pair,
wherein the memory contains instructions, which when executed by the processor, cause the apparatus to:
receive inertial motion unit (IMU) data associated with a motion of the DVS stereo pair, wherein the IMU data is time-synchronized with the event stream of pixel intensity change data, and
perform motion stabilization based on the IMU data.

10. The apparatus of claim 8, wherein the memory contains instructions, which when executed by the processor, cause the apparatus to:
receive a second control signal of the speckle pattern projector (SPP), the second control signal indicating an on/off state, as a function of time, of a second predetermined light pattern projected by the SPP on the field of view, and
perform projected light filtering on the event stream of pixel intensity change data for each sensor of the DVS stereo pair, to generate synthesized event image data, synthesized event image data further comprising a channel based on a third portion of the event stream of pixel intensity change data associated with the second predetermined light pattern,
wherein the second control signal is time-synchronized with the event stream for each sensor of the DVS stereo pair.

11. The apparatus of claim 8, wherein the memory contains instructions, which when executed by the processor, cause the apparatus to:
operates in a low power mode, performing stereo matching on a single channel of the synthesized event image data for each sensor of the DVS stereo pair to generate the depth map for at least the portion of the field of view.

12. The apparatus of claim 8, wherein the depth map is utilized by at least one of an augmented reality (AR) or virtual reality (VR) application.

13. The apparatus of claim 8, wherein the synthesized event image data comprises, for each sensor of the DVS stereo pair and each channel, a histogram of accumulated pixel intensity change data.

14. The apparatus of claim 13, wherein the memory contains instructions, which when executed by the processor, cause the apparatus to:
generate, for each histogram of accumulated pixel intensity change data, a binary representation of the histogram of accumulated pixel intensity change data, and
perform stereo matching based on calculated Hamming distances between binary representations of histograms from different sensors of the DVS stereo pair in a same channel.

15. A non-transitory computer-readable medium comprising program code, which, when executed by a processor, causes an electronic device to:
receive, at the electronic device, a control signal of a speckle pattern projector (SPP), the control signal indicating an on/off state, as a function of time, of a predetermined light pattern projected by the SPP on a field of view,
receive, from each sensor of a dynamic vision sensor (DVS) stereo pair, an event stream of pixel intensity change data, wherein the event stream is time-synchronized with the control signal of the SPP and comprises a first portion associated with light from a scene in the field of view and a second portion associated with the predetermined light pattern projected by the SPP, perform projected light filtering on the event stream of pixel intensity change data for each sensor of the DVS stereo pair, to generate synthesized event image data, the synthesized event image data having one or more channels, each channel based on an isolated portion of the event stream of pixel intensity change data, and perform stereo matching on at least one channel of the synthesized event image data for each sensor of the DVS stereo pair to generate a depth map for at least a portion of the field of view.

16. The non-transitory computer-readable medium of claim 15, further comprising program code, which, when executed by the processor, causes the electronic device to:
receive inertial motion unit (IMU) data associated with a motion of the DVS stereo pair, wherein the IMU data is time-synchronized with the event stream of pixel intensity change data, and perform motion stabilization based on the IMU data.

17. The non-transitory computer-readable medium of claim 15, further comprising program code, which, when executed by the processor, causes the electronic device to:
receive a second control signal of the speckle pattern projector (SPP), the second control signal indicating an on/off state, as a function of time, of a second predetermined light pattern projected by the SPP on the field of view, and perform projected light filtering on the event stream of pixel intensity change data for each sensor of the DVS stereo pair, to generate synthesized event image data, synthesized event image data further comprising a channel based on a third portion of the event stream of pixel intensity change data associated with the second predetermined light pattern, wherein the second control signal is time-synchronized with the event stream for each sensor of the DVS stereo pair.

18. The non-transitory computer-readable medium of claim 15, further comprising program code, which, when executed by the processor, causes the electronic device to operate in a low power mode, performing stereo matching on a single channel of the synthesized event image data for each sensor of the DVS stereo pair to generate the depth map for at least the portion of the field of view.

19. The non-transitory computer-readable medium of claim 15, wherein the depth map is utilized by at least one of an augmented reality (AR) or virtual reality (VR) application.

20. The non-transitory computer-readable medium of claim 15, wherein the synthesized event image data comprises, for each sensor of the DVS stereo pair and each channel, a histogram of accumulated pixel intensity change data.

* * * * *

UNITED STATES PATENT AND TRADEMARK OFFICE
CERTIFICATE OF CORRECTION

PATENT NO. : 11,143,879 B2  
APPLICATION NO. : 16/172473  
DATED : October 12, 2021  
INVENTOR(S) : Sapienza et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this  
Twenty-fourth Day of January, 2023

Katherine Kelly Vidal  
*Director of the United States Patent and Trademark Office*